(12) United States Patent
Brandon et al.

(10) Patent No.: US 10,781,895 B2
(45) Date of Patent: Sep. 22, 2020

(54) BELT TENSIONER FOR PUMPJACK

(71) Applicant: Devon Brandon, Forbisher (CA)

(72) Inventors: Devon Brandon, Frobisher (CA); Anders Brooks Malpass, South Slocan (CA)

(73) Assignee: Devon Brandon, Frobisher, Saskatchewan (CA)

( * ) Notice: Subject to any disclaimer, the term of this patent is extended or adjusted under 35 U.S.C. 154(b) by 290 days.

(21) Appl. No.: 16/012,342

(22) Filed: Jun. 19, 2018

(65) Prior Publication Data

US 2018/0372190 A1 Dec. 27, 2018

Related U.S. Application Data

(60) Provisional application No. 62/523,039, filed on Jun. 21, 2017.

(51) Int. Cl.
*F16H 7/12* (2006.01)
*E21B 43/12* (2006.01)
*F04B 47/02* (2006.01)
*F16H 7/08* (2006.01)

(52) U.S. Cl.
CPC ......... *F16H 7/1281* (2013.01); *E21B 43/127* (2013.01); *F04B 47/022* (2013.01); *F16H 2007/0812* (2013.01); *F16H 2007/0865* (2013.01); *F16H 2007/0893* (2013.01); *F16H 2007/0897* (2013.01)

(58) Field of Classification Search
CPC ........... F16H 2007/0893; F16H 7/1281; F16H 2007/088; F16H 2007/0891; F02B 67/06
USPC .......................................................... 474/135
See application file for complete search history.

(56) References Cited

U.S. PATENT DOCUMENTS

| 2,520,187 | A | * | 8/1950 | Wilshusen | F04B 47/02 74/37 |
|---|---|---|---|---|---|
| 2,695,528 | A | * | 11/1954 | Bernhard | B62D 55/08 474/69 |
| 2,804,041 | A | * | 8/1957 | Neugass | G01D 13/06 116/286 |
| 4,141,245 | A | * | 2/1979 | Brandstetter | G01L 3/247 474/109 |
| 4,702,727 | A | * | 10/1987 | Dahm | F16H 7/1218 474/101 |
| 4,768,930 | A | * | 9/1988 | Grime | F02B 63/06 248/665 |
| 4,938,732 | A | * | 7/1990 | Krude | F16H 9/10 474/53 |
| 4,990,123 | A | * | 2/1991 | Krude | F16H 9/10 474/50 |

(Continued)

*Primary Examiner* — Henry Y Liu
(74) *Attorney, Agent, or Firm* — Tomlinson McKinstry, P.C.

(57) ABSTRACT

A device for tensioning, and facilitating removal and replacement of, the drive belt of an oilfield pumpjack. The device utilizes a regulated air supply, and includes an air driven actuator, namely an air bag, interposed between a base and a frame supporting an idler wheel and pivotally connected to the base, whereby providing air to the air actuator causes the frame to pivot relative to the base so as to the bring the idler wheel into belt-tensioning contact with the pumpjack belt. Evacuating air from the air actuator permits the idler wheel to move away from, and thus slacken, the belt, permitting removal and replacement of the belt.

19 Claims, 7 Drawing Sheets

(56) References Cited

U.S. PATENT DOCUMENTS

| | | | | |
|---|---|---|---|---|
| 5,067,390 A * | 11/1991 | Negishi | F15B 15/103 | 92/117 R |
| 5,145,056 A * | 9/1992 | Smith | B23K 1/0012 | 198/813 |
| 5,195,932 A * | 3/1993 | Hirai | F16H 7/1218 | 474/135 |
| 5,346,437 A * | 9/1994 | Chang | F16H 7/023 | 474/134 |
| 5,409,075 A * | 4/1995 | Nieman | B60G 17/052 | 180/9.5 |
| 6,090,001 A * | 7/2000 | Cantwell | F16H 7/1281 | 474/135 |
| 6,165,089 A * | 12/2000 | McGreal | F16H 7/1263 | 474/101 |
| 6,209,443 B1 * | 4/2001 | Perez | F15B 15/065 | 92/136 |
| 6,688,022 B2 * | 2/2004 | Hanafusa | F16D 27/112 | 37/257 |
| 6,726,532 B2 * | 4/2004 | Lin | B24B 21/20 | 198/813 |
| 7,699,732 B2 * | 4/2010 | Message | F16H 7/1281 | 474/106 |
| 2005/0238496 A1 * | 10/2005 | Mills | F04B 47/02 | 417/42 |
| 2009/0023526 A1 * | 1/2009 | Larouche | F16H 7/14 | 474/101 |
| 2011/0044828 A1 * | 2/2011 | Lund | F04B 9/06 | 417/362 |
| 2011/0152021 A1 * | 6/2011 | Johannsen | B65G 41/008 | 474/110 |
| 2011/0312454 A1 * | 12/2011 | Comsa | F16H 7/1281 | 474/110 |
| 2012/0065009 A1 * | 3/2012 | Mueller | F02B 67/06 | 474/101 |
| 2012/0222506 A1 * | 9/2012 | St. Denis | F16H 21/36 | 74/45 |
| 2013/0172137 A1 * | 7/2013 | Antchak | F16H 7/12 | 474/133 |
| 2014/0309882 A1 * | 10/2014 | Antchak | F16H 7/12 | 701/36 |
| 2015/0247559 A1 * | 9/2015 | Graves | F16H 7/1218 | 474/117 |
| 2016/0040759 A1 * | 2/2016 | Gergis | F16H 7/12 | 474/113 |

* cited by examiner

BELT TENSIONER FOR PUMPJACK

CROSS REFERENCE TO RELATED APPLICATIONS

This application claims the benefit of U.S. Provisional Patent Application No. 62/523,039, filed 21 Jun. 2017.

FIELD OF THE INVENTION

The present invention relates to the field of oilfield equipment, namely pumpjacks and components of same.

BACKGROUND OF THE INVENTION

A pumpjack is the above ground drive for a reciprocating piston down-hole pump used to mechanically lift liquid out of an oil well if there is insufficient bottom hole pressure to cause the oil to flow to the surface. A pumpjack converts the rotary motion of a motor to a vertical reciprocating motion (i.e., the characteristic nodding motion) to drive a pump shaft. Pumpjacks are a common sight in oil-rich areas and are commonly used for low-production wells.

Modern pumpjacks are powered by a prime mover. This is commonly an electric motor, but internal combustion engines may be used in isolated locations without access to electricity. Common off-grid pumpjack motors run on natural gas, often casing gas produced from the well, but pumpjacks have been run on many types of fuel, such as propane and diesel fuel. In harsh climates, such motors may be housed in a shack for protection from the elements.

The prime mover is drivably connected to the transmission, typically via a large belt and a pair of pulleys. Typically, the pulleys are sized to provide a fairly significant speed reduction ratio (i.e., to the reduce rotation speed of the driven pulley while increasing torque). The transmission, (often a double-reduction gearbox to further reduce rotation speed and increase torque), drives a crank (generally with a counterweight). The crank is connected to an end of a connecting rod, the other end of which is connected to the proximal end of a beam having a curved metal box called a horse head or donkey head at its distal end. Intermediate the proximal and distal ends of the beam, the beam is pivotally mounted to a frame (often an A-frame configuration). A cable made of steel—occasionally, fibreglass—called a bridle, connects the horse head to the pump shaft. The pump shaft (which comprises a polished rod passing through a stuffing box, and a plurality of jointed sucker rods) extends from the vicinity of the top of the well to the down-hole pump generally in the vicinity of the bottom of the well, within the tubing (the pipe within which the oil flows to the surface).

Rotational movement of the crank is transmitted to the proximal end of the beam via the connecting rod as a generally reciprocal vertical movement along the arc of rotation defined by the pivoting of the beam proximal end. At the beam distal end this reciprocating movement is transmitted to the pump shaft as a substantially linear reciprocating movement via the bridle and the curve of the horse head.

Pumpjacks operate continuously, generally for years, and often for decades. The belts interconnecting the motor and the transmission are subject to stretching and slipping, and their useful life is generally about 2 years. Thus, it is useful to adjust belt tension from time to time and it is necessary to periodically replace worn belts.

In many pumpjacks, the motor is mounted on rails in such a way that the motor may be releasably secured at different positions along the rails. With such configurations, the belt tension is adjusted by moving the motor along the rails and securing the motor at a rail location providing a desired belt tension. With such configurations, the belt is replaced by moving the motor to a position at which the worn belt can be removed from the pulleys and a new belt placed on the pulleys, and then moving the motor along the rails and securing the motor at a rail location providing a desired belt tension.

SUMMARY OF THE INVENTION

In one aspect, the present invention provides an apparatus for tensioning a pumpjack belt connecting a drive pulley and a driven pulley, the apparatus including: a base; an idler arm frame; an idler wheel rotationally mounted to the idler arm frame; and a pneumatic actuator interposed between the base and the idler arm frame; wherein, in use, with the base secured at a fixed location relative to the drive pulley and the driven pulley in which the idler wheel is in operational alignment with the belt, providing gas at a desired pressure to the pneumatic actuator brings the idler wheel into belt-tensioning contact with the belt.

The idler arm frame may have a proximal end and a distal end and the idler arm frame may be pivotally mounted to the base in the vicinity of the proximal end and the idler wheel may be located in the vicinity of the distal end.

The pneumatic actuator may be an air bag.

The gas may be air and the apparatus may include an air supply system for providing the air at the desired pressure. The air supply system may include: an air compressor; a pressure regulator connected to the air compressor; and a conduit connecting the regulator to the pneumatic actuator. The pressure regulator may be an adjustable regulator, whereby the pressure of the air provided to the pneumatic actuator is user adjustable.

The apparatus may provide: operational positions when the gas of the desired pressure is provided to the pneumatic actuator, including a new-belt position for the idler wheel and a worn-belt position for the idler wheel; and a fully-compressed position in which the idler wheel is not in belt-tensioning contact with the belt and in which the belt is sufficiently slack to permit removal and replacement of the belt. The apparatus may include a position indicator for indicating: the new-belt position, the worn-belt position and the fully-compressed position.

In another aspect, the present invention provides an apparatus for tensioning a pumpjack belt connecting a drive pulley and a driven pulley, the apparatus including: a base; an idler arm frame having a proximal end and a distal end, and being pivotally mounted to the base in the vicinity of the proximal end; an idler wheel rotationally mounted to the idler arm frame in the vicinity of the distal end; and a pneumatic actuator interposed between the base and the idler arm frame; wherein, in use, with the base secured at a fixed location relative to the drive pulley and the driven pulley in which the idler wheel is in operational alignment with the belt, providing gas at a desired pressure to the pneumatic actuator causes the idler arm frame to pivot relative to the base, bringing the idler wheel into belt-tensioning contact with the belt.

The gas may be air and the apparatus may include an air supply system for providing the air at the desired pressure. The pneumatic actuator may be an air bag. The air supply system may include: an air compressor; a pressure regulator connected to the air compressor; and a conduit connecting the regulator to the air bag. The pressure regulator may be an adjustable regulator, whereby the pressure of the air provided to the air bag is user adjustable and the desired pressure is user determined.

The apparatus may provide: operational positions when the air of the desired pressure is provided to the air bag, the operational positions including: a new-belt position for the idler wheel; a worn-belt position for the idler wheel; and intermediate operational positions being positions for the idler wheel intermediate the new-belt position and the worn-belt position; and a fully-compressed position in which the idler wheel is not in belt-tensioning contact with the belt and in which the belt is sufficiently slack to permit removal and replacement of the belt. The apparatus may include a position indicator for indicating: the new-belt position, the worn-belt position and the fully-compressed position.

In another aspect, the present invention may provide an apparatus for tensioning a pumpjack belt connecting a motor pulley and a transmission pulley, the pumpjack including motor mount rails, the apparatus including: a base configured for mounting to the motor mount rails at a user-selected location along the motor mount rails; an idler arm frame having a proximal end and a distal end, and being pivotally mounted to the base in the vicinity of the proximal end; an idler wheel rotationally mounted to the idler arm frame in the vicinity of the distal end and located to be in operational alignment with the belt when the base is mounted at the user-selected location; an air bag interposed between the base and the idler arm frame; and an air supply system for providing air at a desired pressure to the air bag; wherein, in use, with the base mounted at the user-selected location, providing the air at the desired pressure to the air bag causes the idler arm frame to pivot relative to the base, bringing the idler wheel into belt-tensioning contact with the belt.

The air supply system may include: an air compressor; an adjustable pressure regulator connected to the air compressor; and a conduit connecting the regulator to the air bag; whereby the pressure of the air provided to the air bag is user adjustable and the desired pressure is user determined.

The apparatus may provide: operational positions when the air of the desired pressure is provided to the air bag, the operational positions including: a new-belt position for the idler wheel; a worn-belt position for the idler wheel; and intermediate operational positions being positions for the idler wheel intermediate the new-belt position and the worn-belt position; and a fully-compressed position in which the idler wheel is not in belt-tensioning contact with the belt and in which the belt is sufficiently slack to permit removal and replacement of the belt. The apparatus may include a position indicator for indicating: the new-belt position, the worn-belt position and the fully-compressed position.

In another aspect, the present invention provides an apparatus for tensioning a pumpjack belt connecting a drive pulley and a driven pulley, the apparatus including: a base mountable to a pumpjack; an idler arm frame pivotally mounted to the base and supporting an idler wheel; an air bag interposed between the base and the idler arm frame, and having a fully compressed operational configuration, a fully extended operational configuration and partially extended operational configurations therebetween; and an air system configured for selectively moving the air bag between operational configurations and maintaining the air bag in a desired pressure-defined operational configuration; wherein, in use, moving the air bag from the fully compressed operational configuration towards the fully extended operational configuration brings the idler wheel into contact with the belt so as to tension the belt.

DETAILED DESCRIPTION WITH REFERENCE TO THE DRAWINGS

Figure 1:
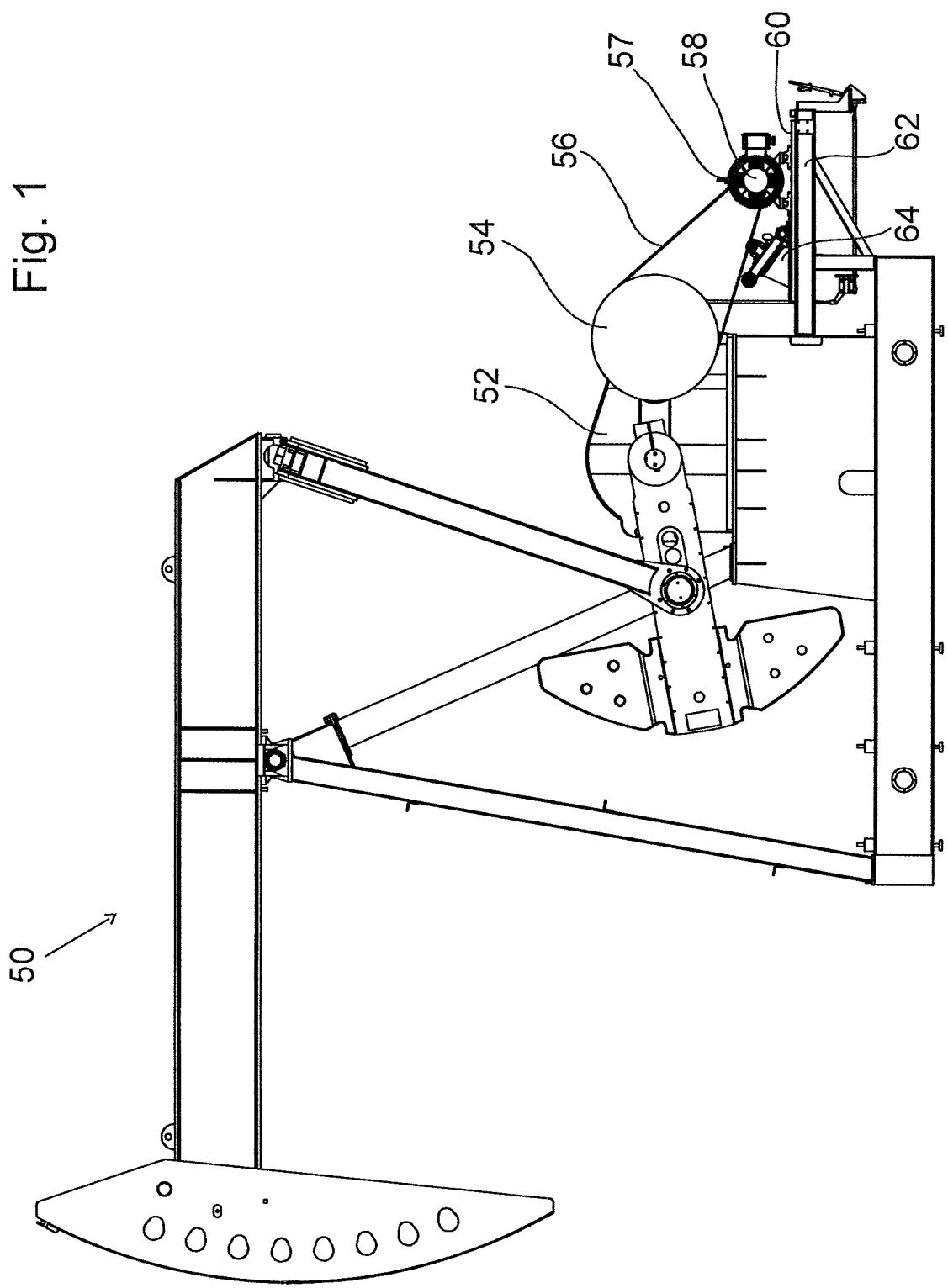
FIG. 1 is a side elevation view of a portion of a pumpjack showing an embodiment of the present invention with the air bag fully compressed.
Figure 2:
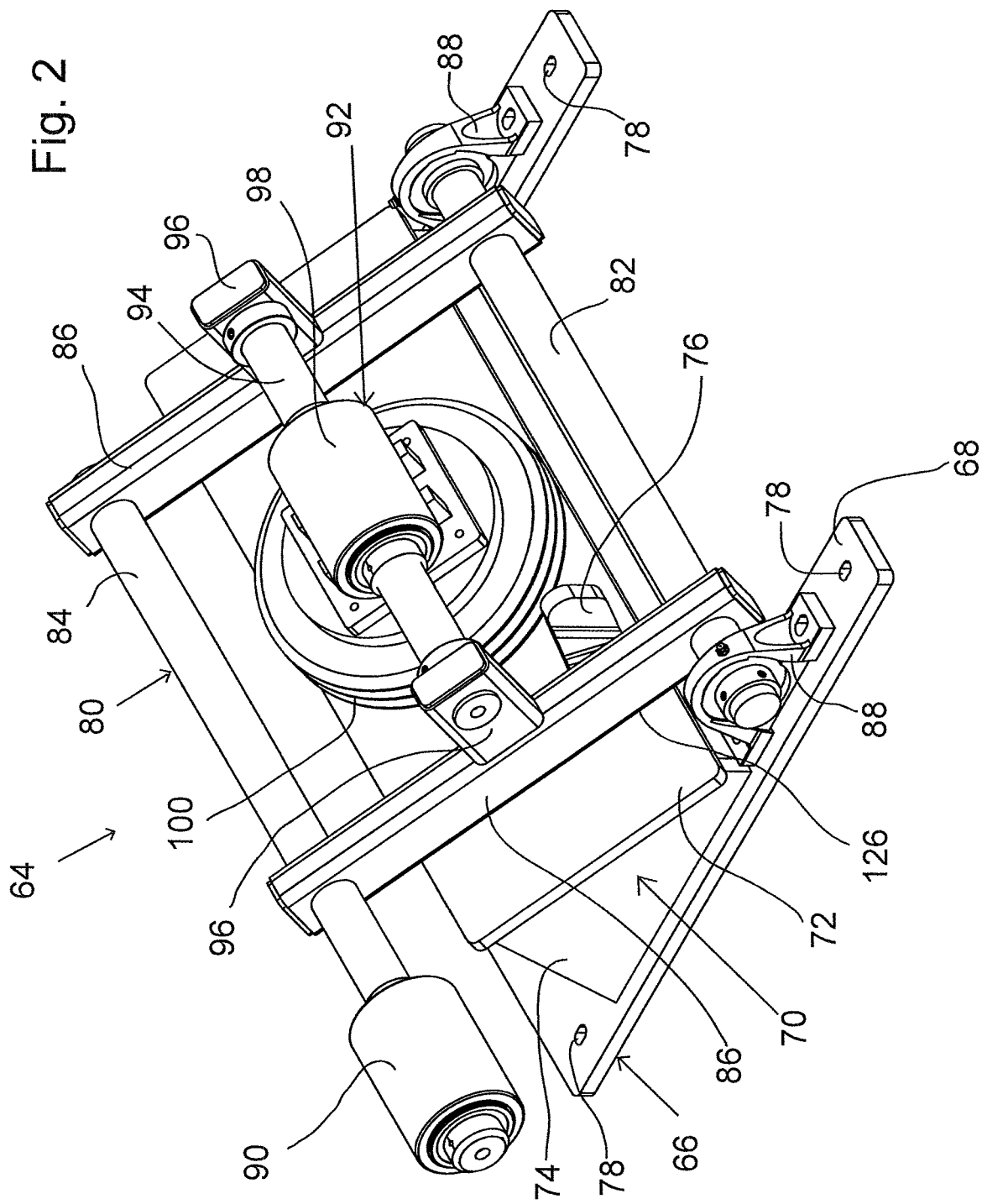
FIG. 2 is a perspective schematic representation showing components of an embodiment of the present invention with the air bag fully compressed.
Figure 3:
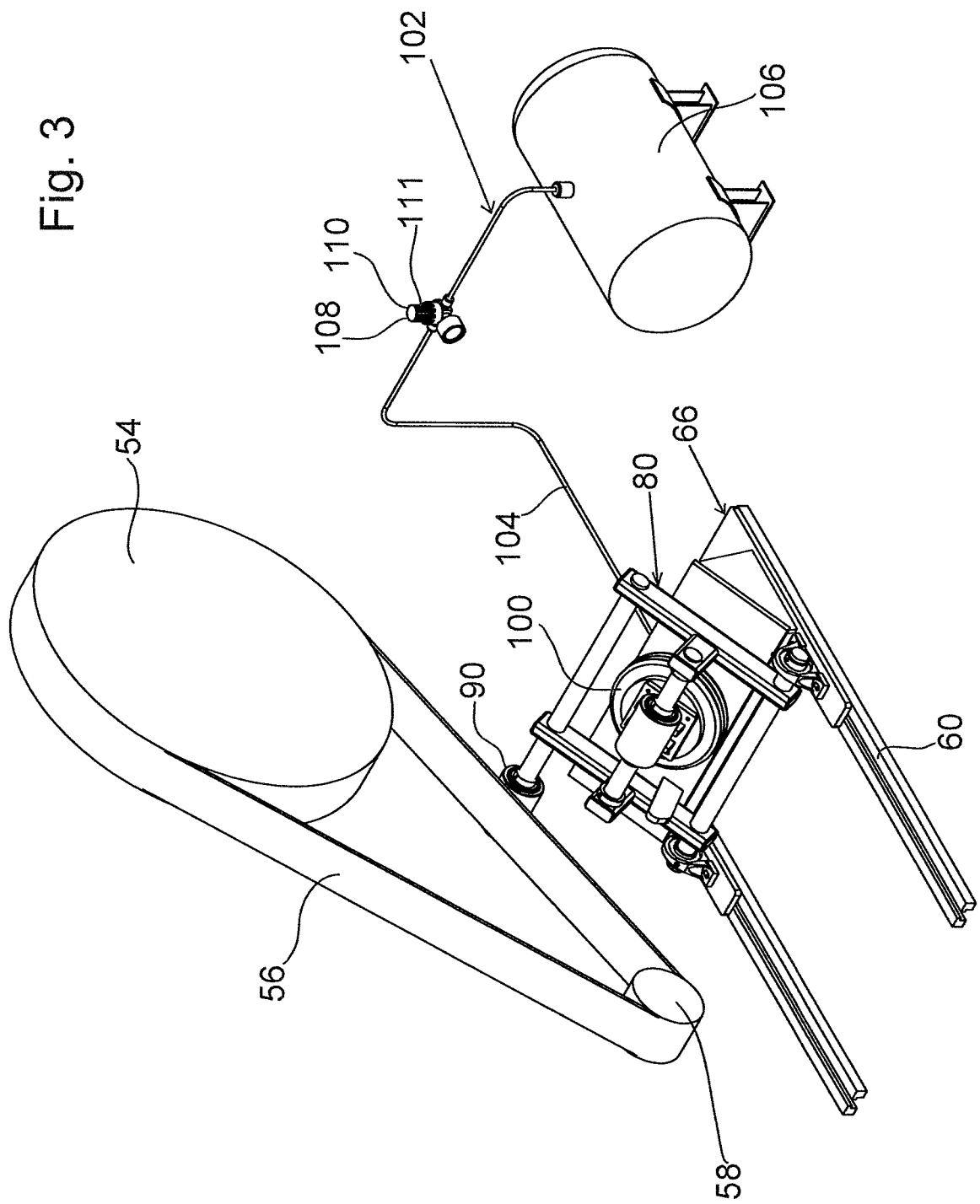
FIG. 3 is a perspective schematic representation showing components of an embodiment of the present invention, and the pumpjack transmission pulley, pumpjack belt and pumpjack motor pulley, with the air bag fully compressed.
Figure 4:
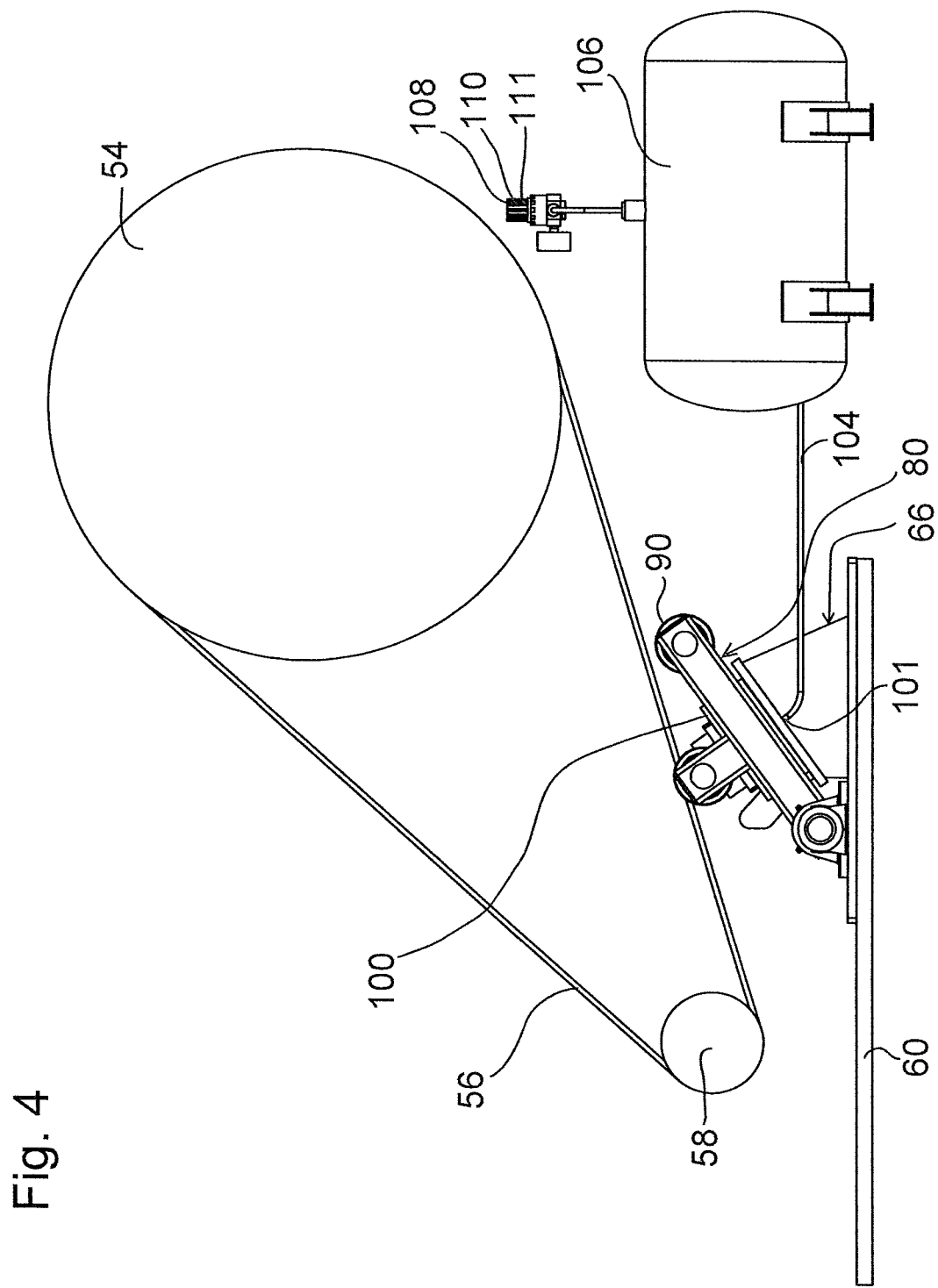
FIG. 4 is side elevation view of the subject matter of FIG. 3.

As shown in the drawings, the typical pumpjack 50 components include a transmission housing 52, a transmission pulley 54, a belt 56, a motor 57, a motor pulley 58, motor mount rails 60 and a support structure 62.

As shown in the drawings, a belt tensioner 64 embodiment of the present invention includes a base assembly 66 for mounting to motor mount rails 60; an idler arm frame 80 pivotally attached to the base assembly 66; and an air bag 100 interposed between the base assembly 66 and the idler arm frame 80 for selectively pivotally positioning the idler arm frame 80 relative to the base assembly 66.

The base assembly 66 includes a base plate 68, an air bag support structure 70 comprising a spanning air bag support plate 72 supported at an angle to the base plate 68 by air bag support legs 74 (being vertically extending plates), and a belt wear/stretch indicator 76 projecting from the air bag support plate 72. The base assembly 66 includes base assembly mounting holes 78 for receiving bolts for attaching the base plate 68 to the motor mount rails 60 and for attaching components to the base assembly 66.

The idler arm frame 80 includes a lower pivot shaft 82 and an upper idler wheel shaft 84, supported by tubular struts 86. Each end of the pivot shaft 82 is supported by a pillow block bearing 88 affixed to the base plate 68, thereby providing relative pivotal movement between the base plate 68 and the idler arm frame 80. An idler wheel 90 is disposed at a projecting end of the idler wheel shaft 84, so as to be in alignment with the belt 56.

Attached to the tubular struts 86 at a position between the pivot shaft 82 and the idler wheel shaft 84, there is an air bag end mount assembly 92 comprising an air bag shaft 94 extending between two air bag shaft legs 96 (each air bag shaft leg 96 being affixed to, and projecting from, a respective tubular strut 86) and an air bag end bushing assembly 98 rotationally mounted to the air bag shaft 94.

One end of the air bag 100 is attached to the air bag support plate 72. The other end of the air bag 100 is attached to the air bag end bushing assembly 98. Goodyear™ Air bag model 3814-464 and Firestone™ Airstroke™ actuator 352 are examples of suitable air bags.

A user controllable air supply system 102 is connected to the air bag 100 at the air aperture 101 via the air conduit 104. The air supply system 102 includes a conventional electrically powered compressor-reservoir combination 106 (e.g., a Firestone™ or Air-Lift™ product) having an integrated shut-off valve, all represented schematically in the drawings as a conventional air vessel; and a regulator 108, pressure gauge 110 and bleed valve 111, all shown schematically in the drawings as a cluster of components. It is understood that a standard off-the-shelf adjustable regulator 108 is suitable for providing the desired operational pressure (typically in terms of a range between minimum and maximum pressures defined by the sensitivity of the regulator 108).

The belt wear/stretch indicator 76 includes a fully-compressed mark 120, a fully-extended mark 122 and a new-belt mark 124 between the fully-compressed mark 120 and the fully-extended mark 122. The marks 120, 122 124 are configured to indicate positions in terms of alignment with the indicator edge 126 (being the edge of the adjacent tubular strut 86 that is closest to the base plate 68 when the air bag 100 is fully compressed).

With the air substantially evacuated from the air bag 100 (i.e., with the air bag 100 in the fully compressed operational position shown in FIGS. 1-4, and the indicator edge 126 substantially aligned with the fully-compressed mark 120), the upper portion of the outer radius of the idler wheel 90 is below a notional single line that is a tangent to both the lower extent of the transmission pulley 54 and the lower extent of the motor pulley 58 (referred to herein as the "tangent line"), such that the idler wheel 90 does not provide any tension to the belt 56. Although not indicated in the drawings, with the air evacuated from the air bag 100 the portion of the belt 56 adjacent the idler wheel 90 would have some slack and would presumably sag.

Figure 5:
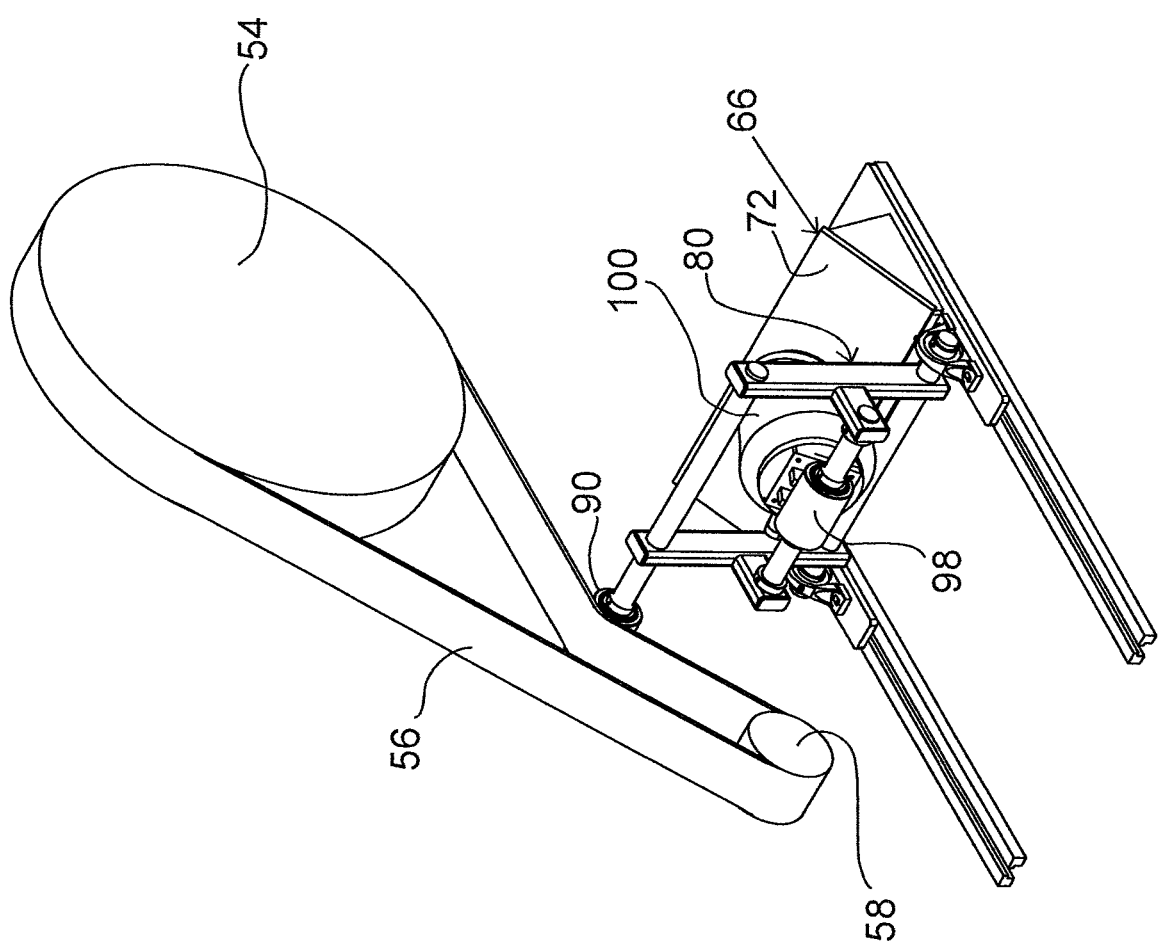
FIG. 5 is a perspective schematic representation showing components of an embodiment of the present invention (shown without air supply components for simplicity), and the pumpjack transmission pulley, pumpjack belt and pumpjack motor pulley, with the air bag fully extended.
Figure 6:
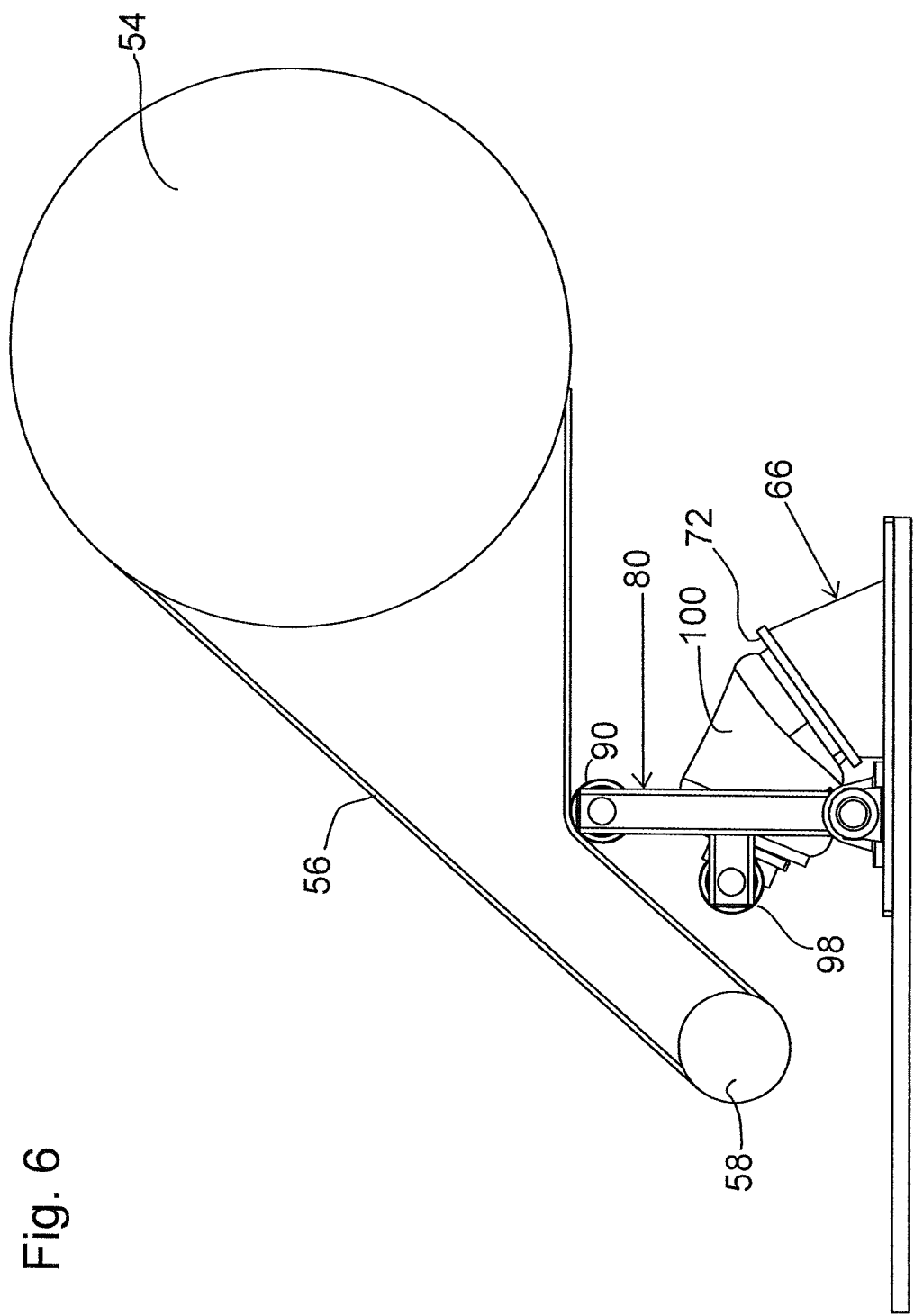
FIG. 6 is a side elevation view of the subject matter of FIG. 5.
Figure 8:
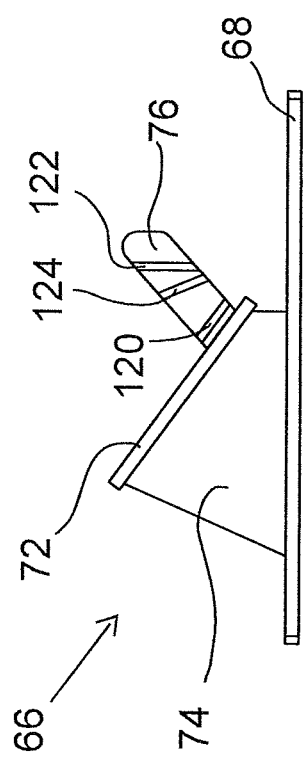
FIG. 8 is a side elevation view of the subject matter of FIG. 7.
Figure 7:
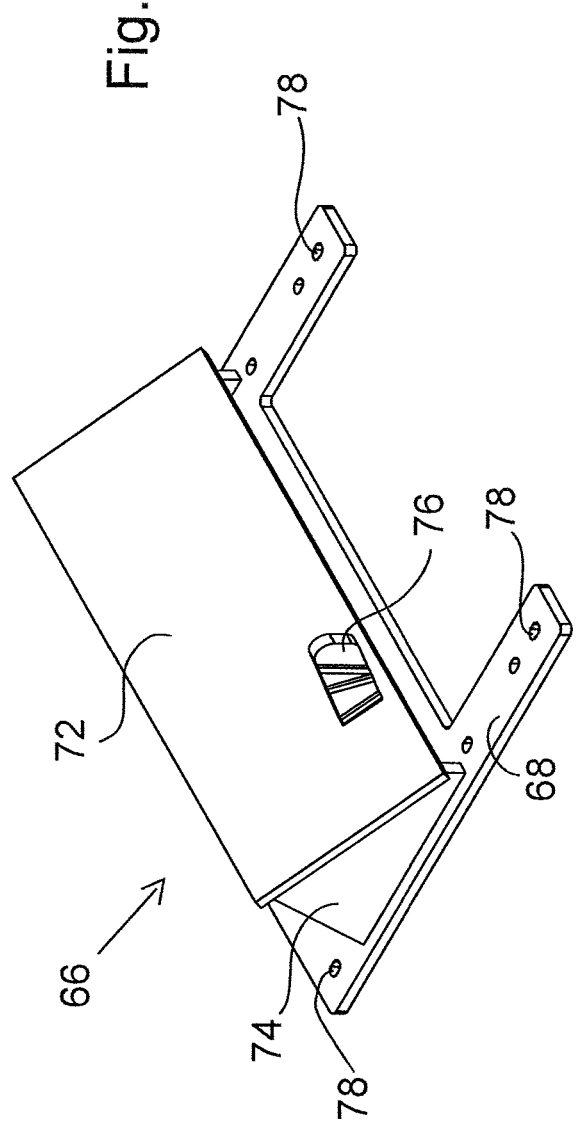
FIG. 7 is a perspective view of the base plate and air bag support structure featuring the belt wear/stretch indicator.

Providing air above atmospheric pressure to the air bag 100 causes the air bag 100 to expand, thereby causing the idler arm frame 80 to pivot upwards so as to bring the upper portion of the outer radius of the idler wheel 90 to above the tangent line so as to provide tension to the belt 56 and potentially ultimately to the fully-extended position shown in FIGS. 5 and 6 (in which the indicator edge 126 is substantially aligned with the fully-extended mark 122). The air bag end bushing assembly 98 is configured to pivot relative to the idler arm frame 80 so as to accommodate some of the change in the relative angles between the idler arm frame 80 and the air bag support plate 72, as the idler arm frame 80 pivots between the fully compressed position and the fully extended position.

The initial installation of the belt tensioner 64 on an existing pumpjack 50, with conventional motor mount rails 60, will presumably require some trial and error (unless positional dimensions have been obtained from a previous installation), because neither the position of the motor 57 along the motor mount rails 60 nor the position of the belt tensioner 64 along the motor mount rails 60, is fixed or pre-determined. Applicant understands that suitable installation steps are as follows: locate the motor 57 along the motor mount rails 60 at a position in which there is just sufficient slack in the belt 56 for removal and replacement of the belt 56 (presumably a new belt); secure the belt tensioner 64 at a position along the motor mount rails 60 wherein, with the idler arm frame 80 in the fully compressed position, the idler wheel 90 is in the vicinity of mid-way along the adjacent portion of the belt 56 extending between the motor pulley 58 and transmission pulley 54; pivot the idler arm frame 80 to bring the indicator edge 126 into alignment with the new-belt mark 124 and without using the air bag 100, fix the idler arm frame 80 in this position (e.g., by temporarily supporting the idler arm frame 80 with a pre-configured support or by an assemblage of available blocks and/or wedges); test the tension of the belt 56 (with a conventional belt tension gauge) and if necessary move the motor 57 to achieve the known desired operational belt tension; secure the motor 57 to the motor mount rails 60 in the position that provides the known desired operational belt tension; remove the temporary support for the idler arm frame 80; with the regulator 108 set for a pressure understood to be below the expected operational pressure, start the compressor-reservoir combination 106 (ensuring that the shut-off valve is open); and adjust the regulator 108 to increase the air pressure in the air bag until the indicator edge 126 is substantially aligned with the new-built mark 124 (using the bleed valve 111 to reduce pressure if needed, i.e., the position of substantial alignment between the indicator edge 126 the new-belt mark 124, is inadvertently passed). Optionally, record the pressure indicated by the pressure gauge for future monitoring of the functioning of the regulator 108 (in case the regulator 108 ices up or otherwise ceases to function properly).

In situations in which the locations of the motor 57 and belt tensioner 64 are predetermined, it may be possible to determine the desired air pressure essentially mathematically, including the following steps: determining the belt static tension using standard V-belt formulas; using the static tension to determine the required force (minimum and maximum allowable); using the range of required force to select the operating pressure of the air bag 100, based on the desired stroke (as obtained from the manufacturer); and applying the operating pressure using pressure gauge 110 and regulator 108. It would of course be prudent to check such a mathematical determination with a conventional belt tension gauge.

Once the desired operation air pressure has been determined, maintaining the desired operational air pressure provides for a relatively stable tension throughout the usable range of belt 56 wear/stretch conditions. The operational air pressure maintains the desired tension, and the position of the indicator edge 126 relative to the new-belt mark 124 and the fully-extended mark 122 provides an indication of the wear/stretch condition of the belt 56.

A worn and/or stretched belt 56 may be changed by: closing the shut-off valve and opening the bleed valve 111 to permit the idler arm frame 92 to pivot to the fully compressed position, which moves the idler wheel 90 away from the belt 56; removing the thus slackened worn and/or stretched belt 56; installing a new belt 56; closing the bleed valve 111 and opening the shut-off valve, which as the regulator 108 has not been adjusted, should provide the desired operation air pressure to the air bag 100 and thus bring the indicator edge 126 into substantial alignment with the new-belt mark 124.

Preferably, lubrication of the idler wheel 90 is accomplished by a conventional automatic greasing system (e.g., a Timken D-Power unit) including a grease relief valve (not shown).

Although obtaining a relatively constant air pressure within the air bag 100 utilizing the regulator 108 is understood to provide a suitable tension to the belt 56, the system and tension could be further refined through use of a computerized electronic pressure controller/regulator connected to a pressure sensor and an idler arm position sensor (not shown).

In some situations, it may not be necessary to provide a gas supply/air compressor. In some pumpjack installations, an existing source of pressurized gas may be available, including compressed air generated for another purpose and possibly natural gas produced incidental to the oil extraction. However it is understood that utilizing natural gas to actuate a pneumatic actuator would likely entail significant safety concerns and technical difficulties.

The scope of the claims should not be limited by the preferred embodiments set forth in the examples, but should be given the broadest interpretation consistent with the description as a whole.

The invention claimed is:

1. Apparatus for tensioning a pumpjack belt connecting a drive pulley and a driven pulley, the apparatus comprising:
    a base;
    an idler arm frame;
    an idler wheel rotationally mounted to the idler arm frame; and
    a pneumatic actuator interposed between the base and the idler arm frame;
    wherein, in use, with the base secured at a fixed location relative to the drive pulley and the driven pulley in which the idler wheel is in operational alignment with the belt, providing gas at a desired pressure to the pneumatic actuator brings the idler wheel into belt-tensioning contact with the belt.

2. The apparatus of claim 1, wherein the idler arm frame has a proximal end and a distal end and the idler arm frame is pivotally mounted to the base in the vicinity of the proximal end and the idler wheel is located in the vicinity of the distal end.

3. The apparatus of claim 1, wherein the pneumatic actuator is an air bag.

4. The apparatus of claim 1, wherein the gas is air and further comprising an air supply system for providing the air at the desired pressure.

5. The apparatus of claim 4, wherein the air supply system comprises:
    an air compressor;
    a pressure regulator connected to the air compressor; and
    a conduit connecting the regulator to the pneumatic actuator.

6. The apparatus of claim 5, wherein the pressure regulator is an adjustable regulator, whereby the pressure of the air provided to the pneumatic actuator is user adjustable.

7. The apparatus of claim 1, wherein the apparatus provides:
    operational positions when the gas of the desired pressure is provided to the pneumatic actuator, including a new-belt position for the idler wheel and a worn-belt position for the idler wheel; and
    a fully-compressed position in which the idler wheel is not in belt-tensioning contact with the belt and in which the belt is sufficiently slack to permit removal and replacement of the belt.

8. The apparatus of claim 7, further comprising a position indicator for indicating: the new-belt position, the worn-belt position and the fully-compressed position.

9. Apparatus for tensioning a pumpjack belt connecting a drive pulley and a driven pulley, the apparatus comprising:
    a base;
    an idler arm frame having a proximal end and a distal end, and being pivotally mounted to the base in the vicinity of the proximal end;
    an idler wheel rotationally mounted to the idler arm frame in the vicinity of the distal end; and
    a pneumatic actuator interposed between the base and the idler arm frame;
    wherein, in use, with the base secured at a fixed location relative to the drive pulley and the driven pulley in which the idler wheel is in operational alignment with the belt, providing gas at a desired pressure to the pneumatic actuator causes the idler arm frame to pivot relative to the base, bringing the idler wheel into belt-tensioning contact with the belt.

10. The apparatus of claim 9, wherein the gas is air and further comprising an air supply system for providing the air at the desired pressure.

11. The apparatus of claim 10, wherein the pneumatic actuator is an air bag.

12. The apparatus of claim 11, wherein the air supply system comprises:
    an air compressor;
    a pressure regulator connected to the air compressor; and
    a conduit connecting the regulator to the air bag.

13. The apparatus of claim 12, wherein the pressure regulator is an adjustable regulator, whereby the pressure of the air provided to the air bag is user adjustable and the desired pressure is user determined.

14. The apparatus of claim 13, wherein the apparatus provides:
    operational positions when the air of the desired pressure is provided to the air bag, the operational positions including:
        a new-belt position for the idler wheel;
        a worn-belt position for the idler wheel; and
        intermediate operational positions being positions for the idler wheel intermediate the new-belt position and the worn-belt position; and
    a fully-compressed position in which the idler wheel is not in belt-tensioning contact with the belt and in which the belt is sufficiently slack to permit removal and replacement of the belt.

15. The apparatus of claim 14, further comprising a position indicator for indicating:
    the new-belt position, the worn-belt position and the fully-compressed position.

16. Apparatus for tensioning a pumpjack belt connecting a motor pulley and a transmission pulley, the pumpjack including motor mount rails, the apparatus comprising:
    a base configured for mounting to the motor mount rails at a user-selected location along the motor mount rails;
    an idler arm frame having a proximal end and a distal end, and being pivotally mounted to the base in the vicinity of the proximal end;
    an idler wheel rotationally mounted to the idler arm frame in the vicinity of the distal end and located to be in operational alignment with the belt when the base is mounted at the user-selected location;
    an air bag interposed between the base and the idler arm frame; and
    an air supply system for providing air at a desired pressure to the air bag;
    wherein, in use, with the base mounted at the user-selected location, providing the air at the desired pressure to the air bag causes the idler arm frame to pivot relative to the base, bringing the idler wheel into belt-tensioning contact with the belt.

17. The apparatus of claim 16, wherein the air supply system comprises:
- an air compressor;
- an adjustable pressure regulator connected to the air compressor; and
- a conduit connecting the regulator to the air bag;
- whereby the pressure of the air provided to the air bag is user adjustable and the desired pressure is user determined.

18. The apparatus of claim 16, wherein the apparatus provides:
- operational positions when the air of the desired pressure is provided to the air bag, the operational positions including:
  - a new-belt position for the idler wheel;
  - a worn-belt position for the idler wheel; and
  - intermediate operational positions being positions for the idler wheel intermediate the new-belt position and the worn-belt position; and
- a fully-compressed position in which the idler wheel is not in belt-tensioning contact with the belt and in which the belt is sufficiently slack to permit removal and replacement of the belt.

19. The apparatus of claim 18, further comprising a position indicator for indicating: the new-belt position, the worn-belt position and the fully-compressed position.

\* \* \* \* \*